United States Patent
Cartwright, II

(10) Patent No.: US 9,215,866 B1
(45) Date of Patent: Dec. 22, 2015

(54) METHOD FOR TREATING AND PREVENTING BEDBUG INFESTATIONS

(76) Inventor: Michael Robert Cartwright, II, El Cajon, CA (US)

( * ) Notice: Subject to any disclaimer, the term of this patent is extended or adjusted under 35 U.S.C. 154(b) by 0 days.

(21) Appl. No.: 13/537,869

(22) Filed: Jun. 29, 2012

Related U.S. Application Data

(63) Continuation of application No. 13/412,403, filed on Mar. 5, 2012, now abandoned.

(60) Provisional application No. 61/449,494, filed on Mar. 4, 2011.

(51) Int. Cl.
*A01M 7/00* (2006.01)

(52) U.S. Cl.
CPC .................................... *A01M 7/005* (2013.01)

(58) Field of Classification Search
USPC .................................................. 43/124, 132.1
See application file for complete search history.

(56) References Cited

U.S. PATENT DOCUMENTS

| 5,309,669 | A | * | 5/1994 | Jackson | 43/124 |
| 5,542,207 | A | * | 8/1996 | Morris, Sr. | 43/132.1 |
| 6,708,444 | B2 | * | 3/2004 | Aesch, Jr. | 43/124 |
| 2001/0054248 | A1 | * | 12/2001 | Neumann | 43/132.1 |

OTHER PUBLICATIONS

B&G Equipment Company, Versafoamer 4000 User's Manual, Oct. 2009.*
William H Robinson, PhD., Insecticide Foam—A Short Course, Feb. 2007.*
William H. Robinson, Foam Application in Professional Pest Control, no date provided.*
Hillingsowrth, Craig et al., Protocols for the Prevention and Control of Bed Bugs in Multiunit HOusing, Oct. 2009.*

* cited by examiner

*Primary Examiner* — Timothy D Collins
*Assistant Examiner* — Richard G Davis

(57) ABSTRACT

A method is disclosed for treating bedbug infestations, that involves filling the lower portions of the void spaces inside a wall with a thick and stable foam, to form a foam barrier inside the walls, allowing the foam barrier to collapse over time to coat portions of the interior of the wall with residual foam. The foam may contain a non-repellant pesticide, but certain foams are effective in treating bedbugs even if the foam does not contain any pesticide.

6 Claims, 5 Drawing Sheets

METHOD FOR TREATING AND PREVENTING BEDBUG INFESTATIONS

CROSS-REFERENCE TO RELATED APPLICATIONS

This patent application is a continuation of application Ser. No. 13/412,403, filed Mar. 3, 2012 now abandoned, which claims the priority benefit of U.S. Provisional Application No. 61/449,494, filed Mar. 4, 2011, entitled "Method for Treating and Preventing Bedbug Infestations".

BACKGROUND OF THE INVENTION

1. Field of the Invention

The present invention relates to the prevention and treatment of bedbug infestations.

2. Description of the Related Art

Bedbugs, known scientifically as *Cimex lectularius* (Cimicidae), are small wingless insects that feed exclusively on the blood of warm blooded-animals, preferably human blood. Newborns, called hatchlings or nymphs, are tiny, about the size of a poppy seed, while adults grow to about ¼ of an inch long. Their shape is oval and flattened. Over millions of years bedbugs have evolved as nest parasites—inhabiting the nests of birds and the roosts of bats. Some of them have adapted to the human environment and live in the places where humans sleep.

Bedbugs can survive a wide range of temperatures and atmospheric compositions. Below 16.1° C. (61.0° F.), adults enter semi-hibernation and can survive longer. Bedbugs can survive for at least five days at −10° C. (14.0° F.) but will die after 15 minutes of exposure to −32° C. (−26° F.). They show high desiccation tolerance, surviving low humidity and a 35-40° C. range even with loss of one-third of body weight.

Bed bugs crawl, moving about as fast as an ant. They cannot jump or fly. They usually stay in dark, tight hiding spots—like the insides of wall—and come out of the hiding spots only to feed. Once they have fed, they scurry back into their hiding places.

Bedbugs feed only on the blood of warm-blooded animals, preferably humans. Their name is derived from the bedbug's preferred habitat of houses and beds or other areas where people sleep. Bedbugs, though not strictly nocturnal, are mainly active at night and are capable of feeding unnoticed on their hosts.

In the developed world, bedbugs were largely eradicated as pests in the early 1940s. However, they have increased in prevalence in recent years, and have now reached epidemic status in various regions of the United States and the World. This has resulted from a variety of factors, including the banning of pesticides such as DDT, greater foreign travel, more frequent exchange of second-hand furnishings among homes, a greater focus on control of other pests resulting in neglect of bedbug countermeasures, and an increasing resistance of bedbugs to pesticides.

Any place with a high turnover of people spending the night has a particularly high risk of infestation. Such dwelling places include, for example, hotels, hostels, resorts, apartments, barracks, cabins, cruise ships, dormitories, dressing rooms, health clubs, homes, hospitals, motels, motor homes, moving vans, nursing homes and other such places, referred to generally herein as "dwelling places." Bed bugs don't prefer locations based on sanitation or people's hygiene.

Most bedbugs live near where people sleep, hiding near the bed, a couch or armchair (if people nap there), or even near cribs and playpens. Their flat bodies allow them to hide in cracks and crevices around the room and in furniture joints. Bed bugs can be found alone, but they prefer to congregate together in good hiding spots. Even when they congregate in groups, they are not social insects and don't build nests. Adults can sometimes live up to a year without a meal.

In the pest control field, it has previously been known to use liquid pesticides to kill insects, including bedbugs. For example, it has been known to spray pesticides throughout a dwelling house and onto all of its contents. Sometimes this involves tenting the entire structure and fumigating the entire structure under the tent.

However, it is not always practical to fumigate or otherwise spray pesticides throughout an entire dwelling structure and its contents. For a hotel, this would require emptying all of the guests out of the hotel for an extended period of time. Moreover, if bedbugs are found in a single room, treating that one room using pesticides will often simply drive the bedbugs into the adjacent untreated room, with the bedbugs traveling through the hollow interior walls, where they are protected from the full brunt of the pesticides.

Another disadvantage of spraying or fumigating with liquid pesticides is that, once an infestation has been controlled using liquid pesticides alone, the pesticides rapidly begin to lose their effectiveness. Thus, controlling a current infestation with liquid pesticides might not prevent future infestations.

It has also been known to use foam as a delivery vehicle for pesticides, in applying pesticides inside walls. For example, pesticide foams have been injected into walls to kill termites living inside the walls. However, the pesticide foams that have commonly been used to kill insects inside walls have been relatively thin and unstable, and rapidly run to the bottom of the wall, forming drops or pools of liquid at the bottom of the wall. This has usually provided an advantage, in that many insects, including termites, are attracted to drops or pools of liquid, including the drops or pools of pesticide-laden liquid that rapidly form at the bottom of the inner wall when a typical foam is injected into the wall.

However, such foam insecticides and approaches have been generally ineffective against bedbugs. Bedbugs are not attracted to pools of liquid, and will avoid any pools of pesticide in the void spaces of a wall. Moreover, even if they come into brief contact with a liquid pesticide or a thin foam pesticide, they are protected by their hard exoskeleton and will usually survive the brief contact. Bedbugs are "non-grooming" insects, which means they do not lick substances from their outer surfaces. Thus, they cannot be readily controlled using known foam pesticides.

One widely used method for treating bedbugs focuses on heating the interior of the building and its contents to high temperatures, in the range of 118-130 F, to kill bedbugs inside the dwelling. However, this method of dealing with bedbugs has disadvantages. It uses a great deal of energy and requires expensive, specialized heaters and other equipment. Heat treatment can also cause damage to the interior of the dwelling or to its contents, such as furniture and vinyl fixtures.

Moreover, heat treatment does not prevent future re-infestations of the same space, after a current infestation has been eradicated. The same is true of most other methods of dealing with bedbug infestations, including vacuuming, tenting with pesticides, freezing and other treatment methods. If any bedbugs survive the heat treatment, or if any new bedbugs are brought into the dwelling in the future, a new infestation can develop.

Thus, there is a need for a different method for treating or preventing infestations of bedbugs, which will control any current infestations and will also limit future infestations for an extended period of time, while avoiding the drawbacks and disadvantages of the prior art techniques for controlling bedbugs.

BRIEF SUMMARY OF THE INVENTION

The current invention accomplishes these goals through a method that involves (1) identifying the room or rooms in a multi-room dwelling house that are infested with bedbugs; (2) identifying the walls that should be treated to contain the bedbugs within the current room or rooms where the infestation exists, and to prevent the bedbugs from migrating to other rooms in the building; and (3) treating each identified wall by filling the lower portions of the void spaces inside the wall with a thick and stable foam, to form a foam barrier inside the walls. When bedbugs travel through the void spaces, they come into contact with the foam and are killed. The foam may contain a non-repellant pesticide. Surprisingly, however, the Applicant has found that certain foams are effective in controlling or killing bedbugs, even if the foam does not contain any added pesticide.

The foam is injected into the void spaces at high pressures, and forms a stable mass of thick foam at the bottom of the wall. The mass of foam retains its general shape and size for an extended period of time, generally more than at least about 120 minutes, and preferably more than 7 hours. The mass of foam then slowly begins to collapse down onto itself over an even more extended period of time, ranging from at least about 1, to about 5 days or more.

The collapsing mass of foam is thick and dry. As it collapses over a period of hours or days, some of the foam remains coated onto the inner surfaces of the walls (e.g., the inner surface of a sheet of drywall that is used to form the wall).

Also, pockets of foam gather and collect and remain in the corners, gaps and crevices that exist where electrical receptacles jut through the drywall into the inside of the wall, or where a sheet of drywall intersects a 2×4 stud inside the wall, or in similar spaces where foam will tend to collect as the main body of foam collapses onto itself over time.

These residual pockets of foam remain inside the wall for an extended period of time, preferably at least about 2½ months or more. The residual pockets of foam are a natural and convenient place for bedbugs to live. The foam does not include any "repellant" pesticide, so bedbugs are not repelled from the foam. The bedbugs live in the foam and are surrounded by and exposed to the foam and any pesticide for long periods of time. Through such prolonged exposure, pesticides are able to penetrate the insect's exoskeleton over time, killing the bedbugs.

In another basic aspect, the invention encompasses walls that are constructed or modified to include a layer of foam in accordance with the teachings herein, to help prevent bedbug infestations or to treat infestations after they have occurred.

In other basic aspects, the invention encompasses an improved foam machine apparatus for injecting the pesticide foams into a wall.

DETAILED DESCRIPTION OF THE INVENTION

Figure 1:
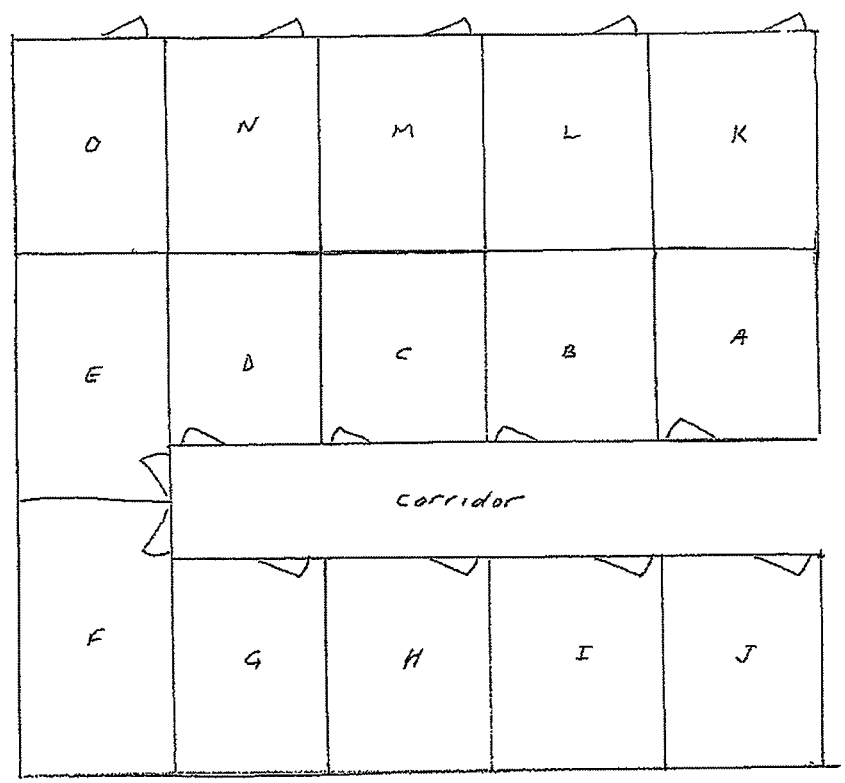
FIG. 1 shows a plan layout of a single story multi-room dwelling house, with individual rooms separated by hollow walls.

Referring first to FIG. 1, the present method is most useful in treating bedbug infestations within a building structure that includes multiple dwelling rooms. FIG. 1 shows the layout for a single story hotel, with a long corridor that leads to rooms on either side of the corridor (rooms A, B, C, D and G, H, I and J) and at the end of the corridor (rooms E and F). A second row of rooms (rooms K, L, M, N and O) shares a common wall with rooms E, B, C, D and E, with each room exiting directly to the exterior of the building.

If a bedbug infestation arose in Room D, for example, one prior art approach for dealing with the problem would be to spray a pesticide inside Room D, to kill any bedbugs that are in the open, on mattresses, or the like. This, however, would very likely cause at least some of the bedbugs to scurry away from Room D, through the walls, into the adjacent rooms C, E and N. Having fled the treated space (Room D) the bedbugs would now be free to infest the remainder of the structure, travelling through the walls to the other dwelling rooms.

Another prior art approach would be to erect a large tent over the entire structure and fumigate the entire structure underneath the large tent. However, that would require all the guests to leave the hotel for several days while the building was tended and the fumigation was performed, even if the bedbug infestation had been limited to only a single room.

In contrast, the present method focuses on (1) identifying the room or rooms that have been infested with bedbugs, and (2) identifying the walls that should be treated to contain the infestation to those rooms; and (3) treating the identified walls to contain the bedbugs to the infested rooms and to eradicate the bedbugs for an extended period.

Assume that, upon inspection, the bedbug infestation was found to be limited to Room D. At a minimum, containment would require treatment of the walls between Room D and each of Rooms E, C and N. One might also choose to treat at least the portions of the walls that form the adjacent corners of Rooms O and M, for example, by treating over to the first vertical wall stud in those walls, in the manner described below. If there are any stories above or blow the infested room(s), the same walls should be treated above and below as are treated on the same floor where the infested room is located.

Figure 2:
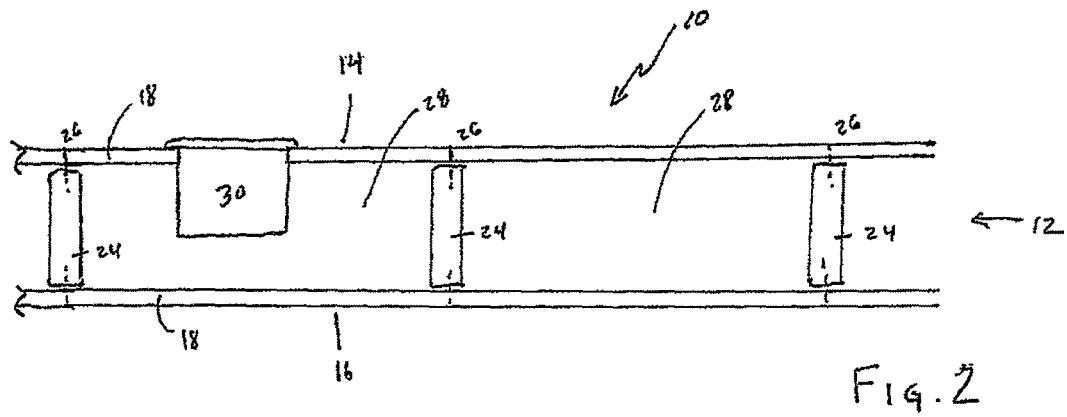
FIG. 2 shows a section of a typical studded wall, viewed from the top.

Referring to FIG. 2, the method for treating an individual wall is described primarily with reference to a typical studded wall 10, which includes a frame 12 with a first side 14 and a second side 16, and one or more sheets 18 of material, such as plywood or drywall, attached over one or both sides 14 or 16 of the frame. The inventions are described primarily with respect to drywall as the sheet material, but a variety of other sheet materials could be used. Further, the invention is not limited to any particular type of wall, but can be used with any wall or structure with interior void spaces where bedbugs might live.

The frame 12 typically includes a bottom plate 20, a top plate 22 and a plurality of studs 24 (usually straight 2×4 boards, as long as the wall is tall) that extend vertically between the bottom plate and the top plate. The sheets 18 are attached to the studs at various points 26, using nails, screws or the like.

Figure 4:
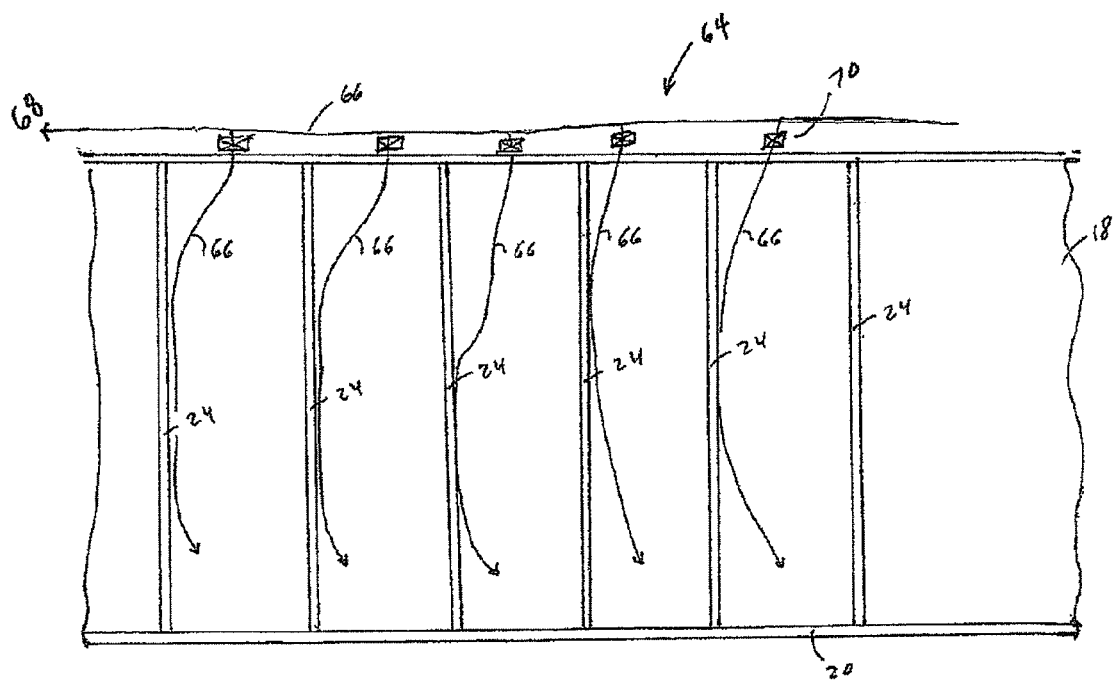
FIG. 4 shows a section of a typical studded wall, viewed from the side with the removed from that side.

As shown in FIGS. 1 and 2, void spaces 28 are formed inside the wall, with the interior surfaces of the void space being formed by the interior surfaces of the sheets 18, the adjacent surfaces of adjacent studs 24 within the wall, the bottom plate 20 and the top plate 22. As shown in FIG. 4, structures 30 such as (for example) electrical boxes or receptacles can extend through one or both of the sheets 18, into the void spaces 28.

Figure 5:
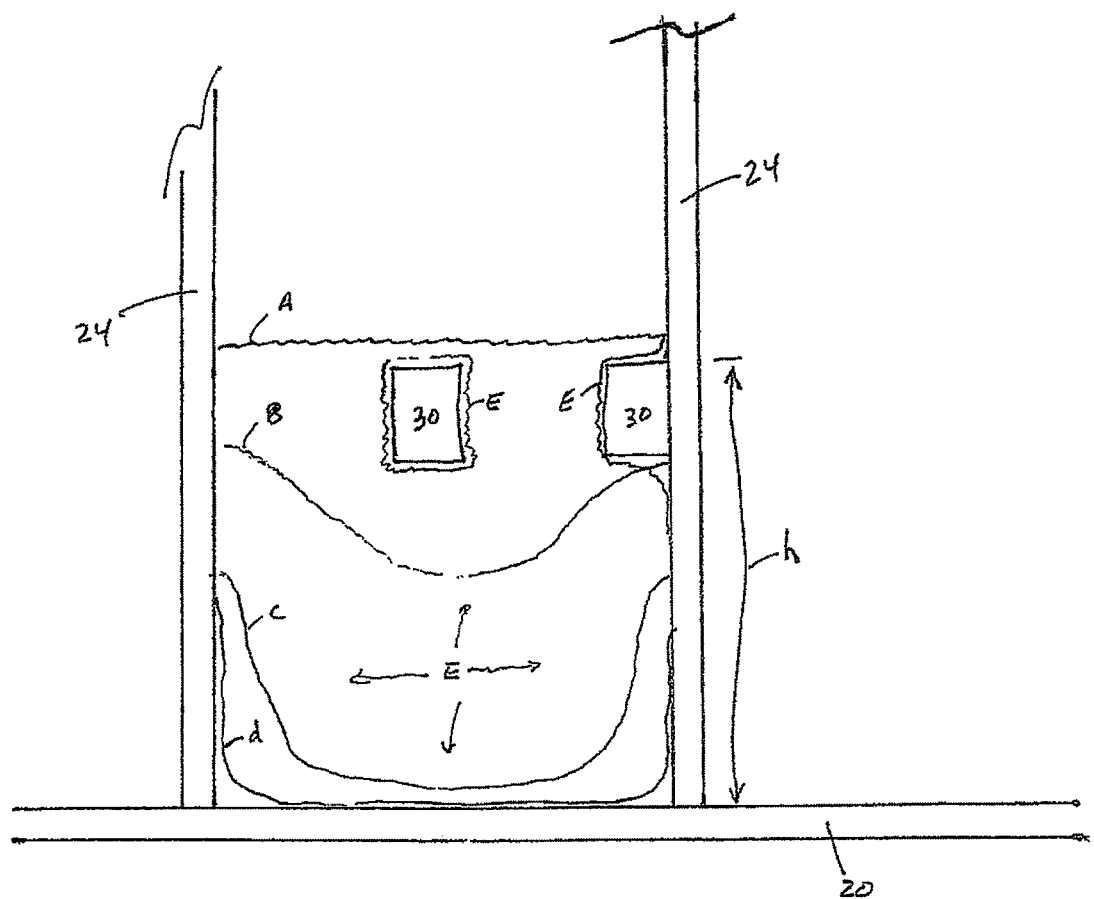
FIG. 5 is the lower portion of a typical studded wall, showing the shape of a foam mass over time, at times A, B, C, D and E.
Figure 6:
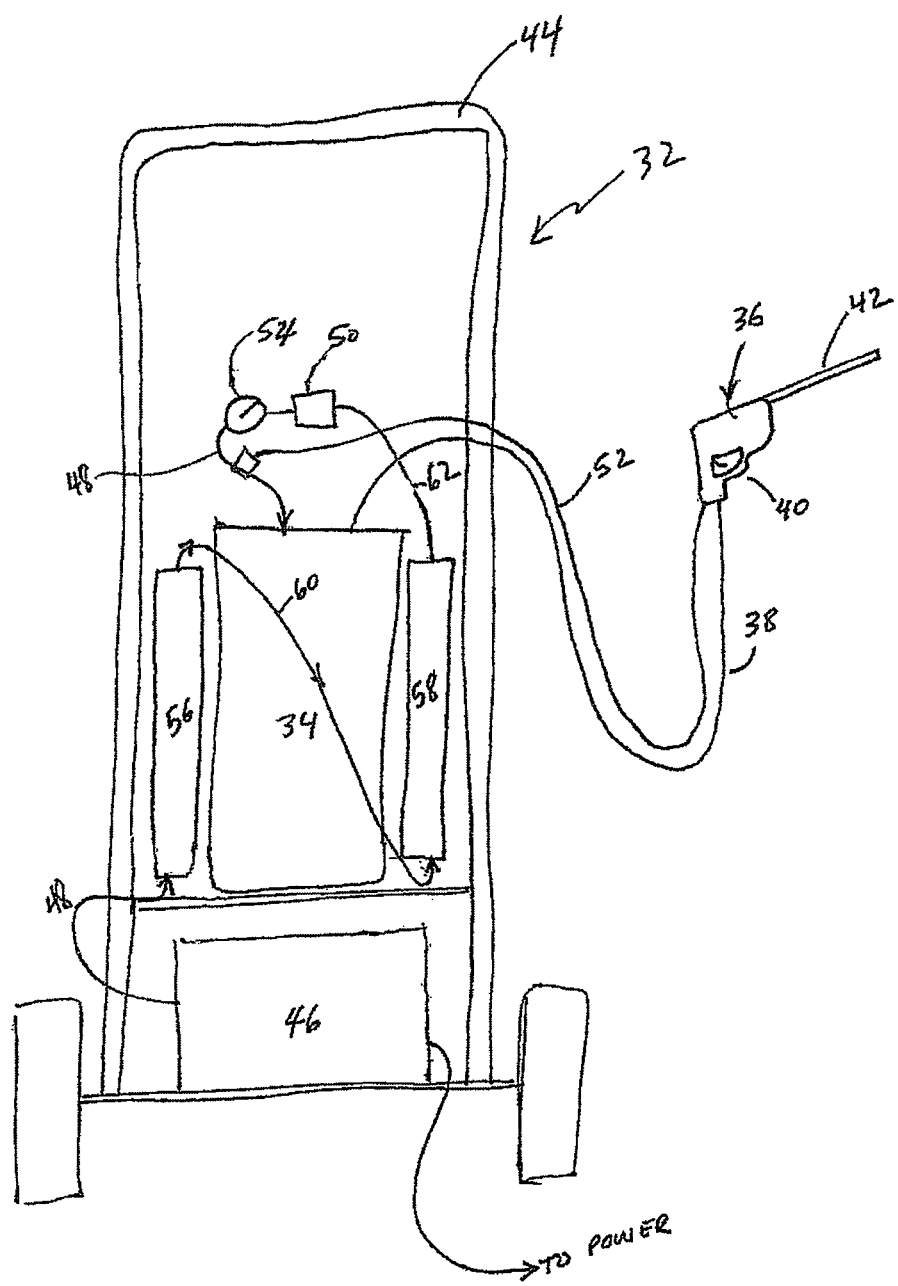
FIG. 6 shows details of a foaming machine for use in accordance with the present invention.

As shown in FIG. 5, the foam is injected into a void space 28 within a wall, preferably until the top of the foam mass is at least as high as "h", at the top of any electrical receptacle 30 in the lower portion of the wall, typically about 14 inches above the floor or base board. This allows foam pockets to form where the receptacle box 30 projects through the wall and into the wall's inner void space 28. The same height of foam mass should be used for void spaces that do not include any structures or receptacles 30. The present invention uses foam that is sufficiently thick and stable to permit the formation of a stable mass of foam at least as 14 inches or more above the floor, to reach above the top of structures 30 within the void spaces 28.

As discussed above, the mass of foam retains its general shape and size for an extended period of time, generally more than at least about 120 minutes, and preferably more than 7 hours. The mass of foam then slowly begins to collapse down onto itself over an even more extended period of time, ranging from at least about 1, to about 5 days or more.

The collapsing mass of foam is thick and dry. As it collapses over a period of hours or days, some of the foam remains coated onto the inner surfaces of the walls (e.g., the inner surface of a sheet of drywall that is used to form the wall). Also, pockets of foam gather and collect and remain in the corners, gaps and crevices that exist where electrical receptacles jut through the drywall into the inside of the wall, or where a sheet of drywall intersects a 2×4 stud inside the wall, or in similar spaces where foam will tend to collect as the main body of foam collapses onto itself over time.

These residual pockets of foam remain inside the wall for an extended period of time, preferably at least about 2½ months or more. The residual pockets of foam are a natural and convenient place for bedbugs to live. The foam does not include any "repellant" pesticide, so bedbugs are not repelled from the foam. The bedbugs live in the foam and are surrounded by and exposed to the foam and any pesticide for long periods of time. Through such prolonged exposure, pesticides are able to penetrate the insect's exoskeleton over time, killing the bedbugs.

Surprisingly, the Applicant has discovered that the foam does not necessarily need to contain a pesticide to be effective in controlling bedbugs. Certain foams have been found to kill bedbugs on their own, without any pesticide being added to the foam. Examples of foams that have been found to be effective in killing bedbugs alone, without any added pesticide, include TERMITAFOAM, a specialty foam for structural pest control use, made and sold by Becker Underwood, Inc., of Aimes, Iowa, and PRO-FOAM, made by Nisus Corporation of Rockford, Tenn. TERMITAFOAM comprises sodium laurel sulfate, disodium laureth-3-sulfosuccinate, coconut fatty acid monoethanolamide, and ammonium salts of ethoxylated and sulfated C8-C10 alcohols as its primary agents. PRO-FOAM comprises sodium decylsulfate, sodium lauroamphoacetate and sodium laurel sulfate as its principal agents.

The mechanism by which the pesticide-free foams kills the bedbugs is not known, but the foam seems to degrade or dissolve the bedbug's exoskeleton and to desiccate the bedbug's inner tissues.

To confirm the ability of a pesticide-free foam to kill bedbugs, live bedbugs were introduced into a wooden box that included a layer of TERMITAFOAM brand foam, to which no pesticide had been added. The foam was made using distilled water, mixed 1:1 (by volume) with the foaming solution. The bedbugs all died within minutes after contacting the foam. About seven days later, a second group of bedbugs was introduced into the box. The second group was also killed within minutes after contacting the foam, to which no pesticide had been added. The foam continued to be effective for killing bedbugs as long as it remained in a foam or gel form, a period of nearly 60 days. Once the foam barrier had fully collapsed and dried out, it was no longer effective in killing bedbugs, but the bedbugs avoided the dried out foam.

A pesticide free method for killing bedbugs has many readily apparent advantages for safety and for the environment. Notwithstanding the many benefits to such an approach, it might make sense under certain circumstances to include a pesticide in the foam, to provide a continued bug killing effect by the residual foam even after the foam barrier has collapsed and dried.

FIG. 4 shows the profile of a typical mass of foam as it collapses down onto itself within a void space within a studded wall. The profile at times A, B, C, D and E is shown. Profile A corresponds to the profile when the foam was first injected into the void space. Profiles B, C and D, respectively, correspond to the profile of the foam mass over time as the foam mass collapses. Profile E shows the coating and pockets of residual foam that remain on the surfaces of the void space for weeks or months after the foam mass has collapsed.

The foam can be made using a commercial foaming agent that is intended for use with pesticides, such as TERMITFOAM or PRO-FOAM, provided the foam is capable of providing a stable, non-repellant barrier of foam as described herein.

The pesticide should be mixed with water according to the label instructions for the pesticide. The foaming agent is then stirred into the pesticide/water solution, in an amount that will form thick, stable foam, similar to thick shaving cream foam. The resulting foam mixture goes into the pressure canister 34 of a foaming machine 32, shown in FIG. 5 and discussed in detail below. The canister 34 typically holds about 2-3 gallons of foam mixture. The canister 34 is pressurized to at least about 60 psi and the foam mixture is injected into the inner wall through a foam nozzle assembly 36, creating the thick, stable foam that is used in the present invention.

The canister 34 can be pressurized using a variety of techniques, including a hand-operated pump assembly built into the canister, or a separate electric compressor connected to the canister by one or more hoses. A foam supply hose 38 leads from the canister to the foam nozzle assembly 36, which typically includes a trigger mechanism 40 for controlling the flow of foam through the nozzle, and may also include a tubular extension wand 42 that can be inserted through tiny holes drilled in the wall (e.g., through the sheets 18 that cover the wall) to reach into the void spaces 28 within the wall. However, regardless of how the canister is pressurized, the pressurization system must be capable of creating and maintaining a pressure inside the canister of at least about 60 psi.

The optimal amount of foaming agent to use in the foam mixture, and the optimal pressure at which to inject the foam mixture through the foam nozzle, will vary from situation to situation, depending on the specific characteristics of the foaming agent used and also depending on the specific characteristics of the foaming machine and the dimensions of the hoses, nozzle and other structures through which the foam is injected. With a typical foam nozzle assembly, and with typical foaming agents, pressures above about 40 psi are generally required. A pressure of at least about 60 psi is preferred, and pressures above 60 psi are particularly preferred, at least to a point. At higher pressures, typically around 80 psi, depending on the foaming agent and the equipment used, the foam tends to become less thick and stable than at lower pressures in the 40-60 psi range, or more preferably in the 60-80 psi range.

In a preferred embodiment, shown in FIG. 5, the foaming machine 30 includes an upright two-wheeled cart or dolly 44, with a canister 34 and an air compressor 46 carried on the cart. The compressor is preferably powered by standard wall current, through a plug and extension cord. A compressor output hose 48 supplies compressed air to the canister 34. A variable pressure regulator 50 is connected in-line onto compressor output hose 48. A nozzle air supply hose 52 branches from the compressor output hose 48, preferably at the point where a pressure gauge 54 is attached in-line on the compressor output hose 48. The nozzle air supply hose 52 provides compressed air to the nozzle assembly 36. A foam supply hose 38 leads from the top of the canister 44 to the nozzle assembly 36. All the hoses are preferably ⅜ to ½ in diameter, with standard compression fittings of other suitable fittings used to make the various connections.

In a particularly preferred embodiment, the compressor output hose 48 connects to the input end of a first expansion chamber 56, which is preferably a 2" section of PVC pipe or hose, approximately 1 foot in length, with an input end and an output end. The expansion chamber 56 is mounted vertically along one side of the canister. A second expansion chamber 58, which is similar to the first expansion chamber 56, is mounted vertically on the opposite side of the canister from the first expansion chamber. A hose 60 leads connects the output end of the first chamber 56 to the input end of the second expansion chamber 56. A hose 62 leads from the second chamber 56 into the top of the canister, after passing through the pressure regulator 50 and the pressure gauge 54.

The ranges set forth herein, for variable factors such as the amount of foaming agent to use, or the best pressure at which to inject the mixture for a given set of equipment, are based on the use of TERMITAFOAM, blended with water in a ratio of 12 oz. foaming agent per gallon of water, injected using a foam machine that includes a ⅓ HP air compressor, drawing 4.4 amps at 115 V, such as compressor model no. 1104902215, made by Gast Manufacturing, Inc., of Benton Harbor, Mich., a 3½ gallon cylinder, two 2" air chambers made using 2" PVC pipe, a nozzle assembly manufactured by H.D. Hudson Manufacturing Company, Chicago, Ill., with a 6" long injection tube with a 3/16" opening.

In another basic aspect, the present inventions are directed to walls that incorporate foams in accordance with the above-described method.

In one aspect, the claimed invention comprises an improved wall design that includes a foam pesticide that has been applied in accordance with the method of treatment described herein.

Figure 3:
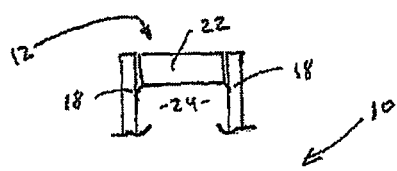
FIG. 3 shows a section of a typical studded wall, viewed from the side looking along the plane of the wall.
Figure 3:
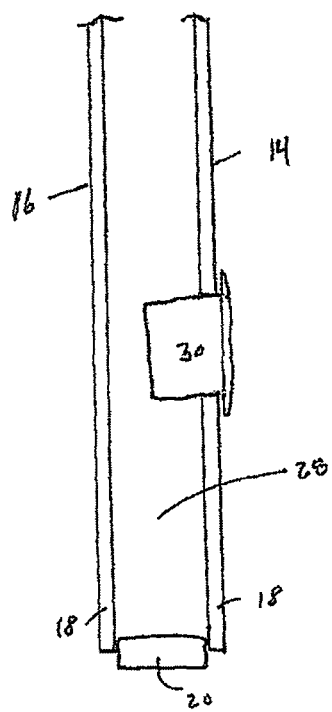

In a particular preferred embodiment, the wall includes a replenishment system 64 with pipes or tubes and associated valves, which are adapted to receive foam from a re-charging canister, and distribute foam into the void spaces inside a wall, to replenish the foam after it has dissipated from a previous application of foam into the void spaces. As shown in FIG. 3, the replenishment system 64 preferably includes a system of pipes or tubes 66 leading from a single injection point 68 to the individual void spaces between studs inside the wall. The pipes are preferably flexible plastic tubing, such as the type used for drip irrigation systems, with inner diameters ranging from 3/16-⅜", and with a plurality of valves 70 for controlling the flow of foam into the individual branches of the system 64. The tubing can be run through the ceiling, with individual branches running vertically down into the void spaces, or can be run horizontally through the wall or in any other configuration that might be suitable for a given wall configuration. The foam exits the outlet end of the individual branches within each void space 28 of the wall, and forms the foam mass in the bottom of the wall. The valves 70 are used to balance the flow of foam into the individual void spaces 28 and to control the height of the foam in a particular void space 28.

What is claimed is:

1. A method of treating a bedbug infestation within a building that includes multiple rooms separated by interior walls having interior void spaces, the method comprising the steps of:
   (a) injecting foam into the void spaces of at least one of the interior walls to form a foam barrier throughout the lower portions of the void spaces within the wall, the foam being free of any pesticide; and
   (b) allowing the mass of foam to remain in place within the wall, with the foam mass slowly collapsing down onto the base, whereupon, as the foam mass collapses, residual pieces of foam are retained on some inner surfaces of the void spaces inside the walls.

2. The method of claim one, wherein the interior walls comprise first and second panels with outer surfaces and inner surfaces that are fixed onto opposite sides of a rigid wall frame that comprises a plurality of vertical wall studs, each stud having a top end and a bottom end, the bottom ends of the studs being affixed to the upper surface of a horizontal baseboard at spaced intervals, the void spaces being formed by the upper surface of the baseboard, the adjacent vertical studs in the inner surfaces of the first and second panels.

3. The method of claim two, wherein the foam barrier is formed onto the upper surface of the base board between a plurality of adjacent vertical studs.

4. The method of claim three, wherein the foam barrier is formed to a height of at least about 14 inches from the surface of the base.

5. The method of claim three, wherein the foam is injected into void spaces through a system of a plurality of tubes that extend from a foam source into the void spaces within the wall.

6. The method of claim one, comprising the additional steps of (a) inspecting the building to identify each individual room that has been infested with bedbugs; and (b) identifying those walls that should be treated to contain the bed bugs within the infested rooms and to prevent them from moving through the walls into other rooms; and (c) treating the identified walls in accordance with claim 1.

* * * * *